July 9, 1940.  C. E. MAYNARD  2,207,098
METHOD OF MAKING TIRE TREAD
Original Filed April 6, 1937   2 Sheets-Sheet 1
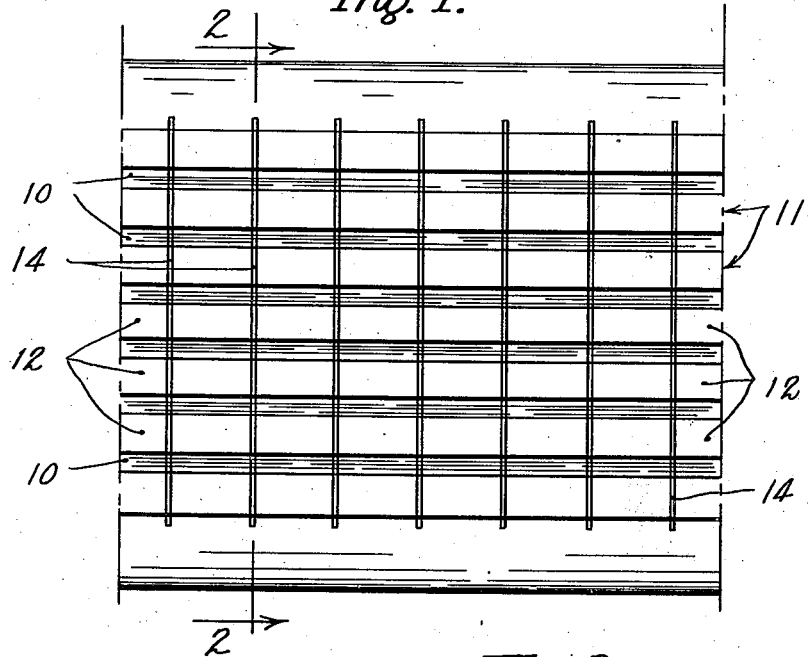
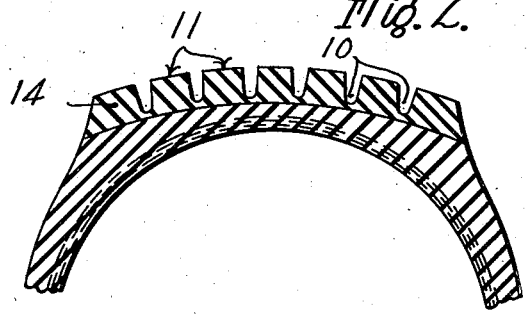
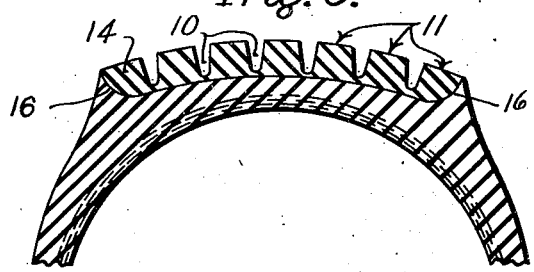
INVENTOR
CHARLES EDGAR MAYNARD
BY Chapin + Neal
ATTORNEYS July 9, 1940. C. E. MAYNARD 2,207,098
METHOD OF MAKING TIRE TREAD
Original Filed April 6, 1937 2 Sheets-Sheet 2
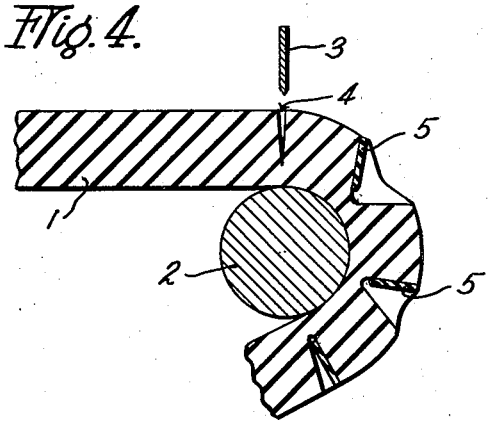
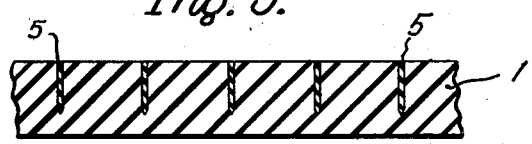
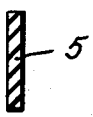
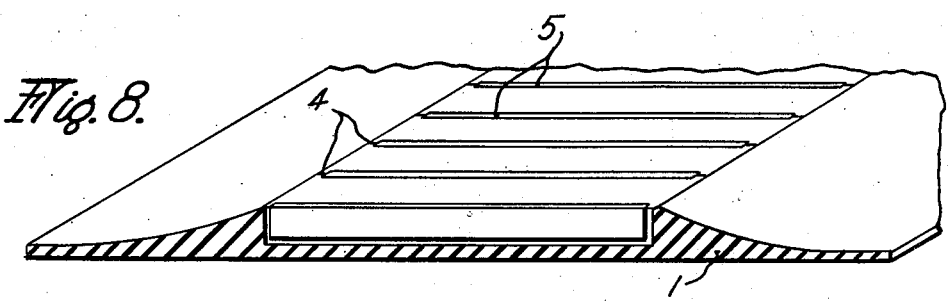
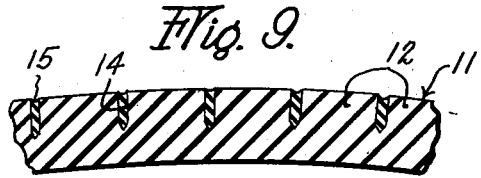
INVENTOR
CHARLES EDGAR MAYNARD
BY
Chapin + Neal
ATTORNEYS Patented July 9, 1940

2,207,098

UNITED STATES PATENT OFFICE 2,207,098

METHOD OF MAKING TIRE TREAD

Charles Edgar Maynard, Northampton, Mass., assignor, by mesne assignments, to United States Rubber Company, New York, N. Y., a corporation of New Jersey Original application April 6, 1937, Serial No. 135,283. Divided and this application December 21, 1937, Serial No. 181,000

2 Claims. (Cl. 154—14)

This invention relates to rubber vehicle tires and their construction and more particularly to the tread portion of such tires.

It is the principal object of the invention to improve the non-skid properties of the tread without sacrifice of the wearing qualities of the tread.

Other and further objects residing in the details of the construction will be apparent from the following specification and claims.

This application is a division of my pending application Serial No. 135,283, filed April 6, 1937.

In the accompanying drawings, which illustrate the invention—

Fig. 1 is a plan view of the tread portion of a tire made according to the invention;

Fig. 2 is a transverse sectional view taken substantially on line 2—2 of Fig. 1;

Fig. 3 is a view similar to Fig. 2 but showing a modification;

Figs. 4 and 5 are longitudinal sectional views showing the preferred method of constructing the tread;

Figs. 6 and 7 are respective sectional views on a larger scale showing two forms of rubber inserts;

Fig. 8 is a perspective view of an unvulcanized tread strip embodying the invention; and Fig. 9 is a longitudinal sectional view showing the normal relation of the inserts to the body of the tread during the progress of tread wear.

It will be understood that these drawings are not to scale.

The two principal functions of a tire tread are to resist the abrasion from road contact, that is to resist wear, and second to grip or hold the road, in other words, to secure traction and prevent "skidding." Much time and money have been spent in the various attempts which have been made to provide a tire tread that would adequately meet these requirements, but in general improvement in one function has heretofore entailed sacrifice of the other.

The obvious answer to tread wear would seem to be to toughen and stiffen the rubber of which the tread is made by suitable compounding. Rubber compounds are in fact available which possess wear resisting properties superior to the compounds now commonly used for tire treads. Two principal reasons, among others, why these superior compounds, long available, have not been usable in practice in the past are that with increased wear resisting properties the stiffness of the rubber is increased with the result that the proper flexing of the tire carcass is interfered with, with the result that the life of the tire is shortened due to breaking down of the carcass. Furthermore, the stiffer, less flexible tread impairs the riding comfort of the tire. The second difficulty is that these stiffer, more wear-resisting compounds are more subject to cracking and breaking.

The common method of imparting non-skid properties to a tire tread is to provide the tread surface with ribs, or variously shaped blocks, separated by grooves, or a combination of ribs and blocks in various arrangements forming the so-called tread design. The outer portion of the tread is thus divided into elements or members which are free to flex and move relative to each other. The decrease of the tread thickness in the grooves and the ability of the tread members to flex give flexibility to the tread as a whole which with the multiplicity of edges presented to the road tends to prevent skidding. Obviously, the non-skid properties persist only during the life of the tread members and when the tread wears down to the bottom of the grooves the non-skid properties end. Such construction, however, does not permit the use of the most wear-resistant stocks because, as above pointed out, such stocks tend to break and crack at the exposed edges of the tread members and at the bottom of the grooves, and because of their greater stiffness decrease the flexibility of the tread. If the attempt is made to overcome this latter difficulty by deepening the grooves, the tendency to cracking of the tread is increased. Present practice is, therefore, a compromise and the necessary flexibility is obtained by a sacrifice of wearing qualities, anti-skid properties, and the persistence of the latter. Recently it has been proposed to increase the non-skid properties by narrowing the grooves to mere slits or cuts, and increasing their number. This secures the desired improvement in non-skid properties but materially increases the hazard from cracking at the bottom of the slits or cuts when subjected to traction strain. This has been met by a further sacrifice of flexibility and persistence of the anti-skid properties through decreasing the depth of the cuts or slits as compared with the previous depth of the wider grooves. In practice such cuts extend only about one-third of the conventional design depth. Moreover, where cuts are employed it has in the past been necessary to make these cuts in the tread after the tread has been placed on the tire and the tire vulcanized.

By my invention the above necessity for compromise is greatly minimized or even entirely obviated, and a much fuller advantage may be taken of improvements in the wearing properties of tread stock at the same time that maximum anti-skid properties throughout substantially the useful life of the tread are obtained, together with the desired degree of flexibility of the tread as a whole.

In general my proposal is to provide the tread, while unvulcanized, and preferably in strip form, with a plurality of cuts defining tread members; filling these cuts with a softer, less wear-resisting but more flexible and elastic rubber compound, preferably in the form of a thin strip substantially commensurate in width with the depth of the cuts to be filled, which cuts are made deep enough so that the insets will persist substantially throughout the useful life of the tire. The so constructed tread is then placed on a tire carcass in accordance with usual building methods and the tire vulcanized in the usual way, thus bonding the insets to the body of the tread.

The invention will now be described in detail, reference being had to the accompanying drawings.

According to my preferred practice an uncured strip of tread stock, a portion of which is shown at 1 in Figs. 4, 5, and 8, is fed over a roll as indicated at 2 in Fig. 4, thus placing the outer portion in tension. A knife, preferably heated, indicated at 3, is then brought down to form a cut in the tread as at 4, the cut opening up as indicated in the figure because of the tension to which the outer portion of the material is subjected in being bent around the roll. As the tread strip advances, a strip of soft, elastic gum stock 5, later more fully described, is placed in the cut. Since the uncured stocks are tacky, the normal tackiness of the tread stock being increased by the use of a heated knife, the strip is conveniently stuck against one wall of the cut. Upon release of the tension the inset gum strip is gripped in the cut as shown in Figs. 5 and 8. The thus prepared tread strip is thereafter handled in the building operations in the usual manner.

The tire is cured or vulcanized in the usual way and, during vulcanization the gum insets become integrally bonded to the body of the tread. Depending on the character of the tire desired, the tire may be vulcanized to provide an initially smooth tread or it may be provided with circumferential grooves, as shown at 10 in Figs. 1, 2, and 3, forming circumferential ribs 11 which are divided into tread members 12 by the insets indicated at 14. It will be understood that, if desired, tread configurations other than circumferential ribs may be molded in the tread. In any case the insets preferably extend into the tread below the surface of the bottom of the grooves and to a depth sufficient to persist throughout the useful life of the tread.

In Fig. 2 the insets are shown as extending transversely through the sides of the road engaging portion of the tread, while in Fig. 3 the ends of the insets stop short of the side surface, as indicated at 16.

The physical properties which the insets must possess may be secured with substantial variation in the materials used and the methods of compounding it, as will be obvious to those skilled in preparing rubber compounds, and it is only necessary to point out here the function the insets are called upon to serve in the use of the finished tire and the properties needed to overcome certain difficulties met with in the construction and curing of the tire.

One main function of the insets is to give flexibility to the tread as a whole and permit relative movement of the tread members which they separate. In other words, the material of the insets should be sufficiently flexible and elastic to permit the tread members to tilt and the tread as a whole to flex and accommodate itself to the road surface in substantially the same manner as though the members were separated by slits.

What is known in the art as pure gum cushion stock is here given as an example of a material which when vulcanized possesses the desired physical characteristics of softness, flexibility, and elasticity, and will also serve to illustrate the manner in which the difficulties of construction may be overcome and also the desired unvulcanized properties. In general such a stock is compounded to contain the maximum amount of pure rubber and the minimum of other materials such as vulcanizing ingredients. A typical gum cushion stock formula is as follows:

| | Per cent |
|---|---|
| Rubber | 89.00 |
| Mercapto benzothiazole | .50 |
| Sulphur | 2.25 |
| Zinc oxide | 7.25 |
| Stearic acid | 1.00 |

It has been found, however, that such stocks when made by the milling and mixing practices usually followed in preparing it for use as a cushion member in a tire will not work satisfactorily when used for the insets in constructing a tire tread according to my invention. When so prepared it tends to flow from the cuts as the tire tread softens and the tire expands into the mold under the internal fluid pressure applied during vulcanization, with the result that the gum stock is found in part spread over the surface of the finished tire and the cuts are only irregularly filled. This difficulty may be overcome by reducing the amount of milling or plasticizing, to which the rubber portion of the compound is subjected, to the minimum necessary to permit its subsequent processing into strips of gum stock. When so prepared the gum stock in its uncured condition has a coherence and an immobility during vulcanization which, while undesirable for the uses to which such stocks are ordinarily put, are highly desirable for the purposes of my invention. This immobility during vulcanization may of course be secured in other ways. For example, it might be obtained by "setting up" the stock, that is by a very slight air curing of the stock, or relatively fast curing stocks might be employed, but such procedures are less practical because of the critical time elements involved and the character of the accelerators required. It will be understood that the above discussion of pure gum cushion stock is by way of illustration only and for the purpose of indicating what is meant by softness, flexibility, and elasticity in the material of the insets when vulcanized, and its immobility during vulcanization. A number of compounds which possess or may be easily given these properties in varying degrees will occur to the skilled rubber technician; vulcanized and unvulcanized latex dispersions are mentioned as further examples.

When the tire is vulcanized the exposed surface of the insets 14 are flush with the surface of the adjacent members of the body of the tread. When in use the flattening of the portion of the tire in contact with the road moves the tread members together, causing the insets to bulge outwardly and, since the material of the insets has little resistance to wear, the displaced portion of the inserts wears off with the result that when the deforming pressure is relieved the exposed surface of the insets assumes a concave form, as shown at 15 in Fig. 9, and this relation continues during the life of the insets, the latter wearing slightly ahead of the body of the tread. Because of the narrow width of the insets which prevents their functioning as a wear resisting portion of the tread surface, this retreat of the insets below the surface of the body of the tread is never substantial or sufficient to dangerously expose the edges of the tread members to destructive influences. For practical purposes and within the meaning of the term as here used the insets remain substantially flush with the tread surface. This gives the measure of the permissible range in the transverse thickness of the insets. They must be at least thick enough to permit sufficient relative movement between the individual tread members to provide the desired degree of flexibility in the tread to cooperate with the carcass in accordance with the practice in that respect which is being followed. The upper limit of permissible transverse thickness of the insets is reached short of the point where they begin to function as part of the tread surface itself and are subjected to wear sufficient to lower them below the surface of the tread members to a degree that exposes the edges of the latter to destructive chipping. Within these limits the insets may have any surface shape desired. An increase in the flexibility of the tread as a whole can be secured by increasing the number of the insets.

The transverse thickness of the insets increases slightly during vulcanization of the tire due to the expansion of the tire in the mold under internal fluid pressure.

The insets are preferably made to extend sufficiently into the tread to persist throughout the useful life of the tread, that is, until the tread becomes dangerously thin. I do not of course limit myself to the maximum in this regard as the advantages of my invention are secured, whatever the depth to which the insets are carried, during the life of the insets.

Satisfactory results have been obtained by providing the tread of a four-ply 6.00–16 tire with 89 insets positioned transversely of the tread and spaced $\frac{21}{32}$ of an inch apart circumferentially around the tread, the latter being provided with seven circumferential ribs of the character shown in Fig. 1. Uncured, the gum insets measured .04 of an inch in transverse thickness, $\frac{3}{8}$ of an inch in height, and $4\frac{9}{16}$ inches in length. They were set in cuts approximately $\frac{1}{16}$ of an inch in depth and approximately $4\frac{5}{8}$ inches in length, and in the cured tire approximated .062 in transverse thickness at the tread surface.

The excess of the dimensions of the cuts over those of the insets is to facilitate assembly and permit adjustment of the insets to the cuts during vulcanization, and giving further assurance that the material of the insets will not be forced out of the cuts.

As previously stated, the use of the insets permits the use of stiffer and more wear-resisting tread stock; in the illustrative example above given, for instance, a tread stock can be used which, under ordinary circumstances, should increase the life of the tread by around 8%.

From the standpoint of tread wear and antiskid properties alone, the maximum advantage of my invention would be secured by replacing all grooving of the tread by variously arranged soft rubber insets, so that the tread would present a substantially smooth surface. Since, however, traction in snow or mud continues to be a factor in the service of most tires, some grooving of the tread is desirable, but my invention makes it possible to reduce such grooving to the minimum necessary for the particular service they are to perform.

It will be understood that the broad principle of my invention is applicable to tires generally, although subject to specific modifications to meet special conditions, as will be readily understood by those skilled in the art.

I claim:

1. The method of constructing a tire tread which comprises forming a plurality of cuts in the tough wear-resisting rubber of the tread while the latter is unvulcanized, filling said cuts with a more flexible less wear-resisting rubber compound than that forming the body of the tread, the rubber component of said latter compound being processed an amount insufficient to destroy its natural resistance to flow when heated to vulcanizing temperature and subjected to molding pressure, and vulcanizing the so-formed tread.

2. The method of constructing a rubber tire tread which comprises forming a plurality of cuts in the tough wear-resisting rubber of the tread while the latter is unvulcanized, filling said cuts with a rubber composition which will be more flexible and deformable after vulcanization than the tread rubber, the milling of the filler material being restricted to the minimum necessary to form it, and vulcanizing the so-formed tread.

CHARLES EDGAR MAYNARD.